United States Patent [19]

Cantella et al.

[11] 3,731,892
[45] May 8, 1973

[54] SPATIAL DISCRIMINATION SYSTEM FOR USE WITH PULSED OPTICAL ENERGY AND TELEVISION PICK-UP TUBES

[75] Inventors: Michael J. Cantella, Winchester; Max W. Stewich, Chelmsford, both of Mass.

[73] Assignee: The United States of America as represented by the Secretary of the Army, Washington, D.C.

[22] Filed: July 21, 1970

[21] Appl. No.: 56,032

[52] U.S. Cl. ...........................244/3.16, 102/70.2 R
[51] Int. Cl. .........F41g 7/14, F41g 9/00, F41g 11/00
[58] Field of Search..........................244/3.13, 3.16; 102/70.2

[56] References Cited

UNITED STATES PATENTS

| | | |
|---|---|---|
| 3,072,819 | 1/1963 | Sternglass...............................315/11 |
| 3,439,167 | 4/1969 | Fox et al...........................244/316 X |
| 3,448,271 | 6/1969 | Aldrich et al....................244/3.16 X |

Primary Examiner—Benjamin A. Borchelt
Assistant Examiner—Thomas H. Webb
Attorney—Harry M. Saragovitz, Edward J. Kelly, Herbert Berl and Harold W. Hilton

[57] ABSTRACT

A spatial discrimination system for use with pulsed optical energy which allows a television viewer or aircraft terminal guidance system to distinguish between steady and pulsed sources of light. Video electronic spatial discrimination takes advantage of the spatial characteristics of a point source to distinguish it from extended spatial objects. Basic spatial discrimination performance is extended to permit rejection of all signals except the desired point source pulse. Laser energy is reflected from a target and detected by the television camera or terminal guidance system in an approaching aircraft. The detected signal is coupled through an image tube, providing a video frequency output for indicating the position of the target. The image section of the tube is surrounded by a modulating coil for displacing the image along the direction of the raster scan lines, producing an elongated charge pattern on the storage surface of the tube. An elongated charge pattern does not fulfill the spatial discriminator requirements for acceptance and thereby allows original point source signals such as continuous waves to be eliminated from the video. For a point source, as the reflected pulse of laser energy having a time duration less than the displacement dwell time on each resolution element, the spatial properties are preserved, thus providing a signal for directing aircraft flight toward the target.

7 Claims, 3 Drawing Figures

Michael J. Cantella
Max W. Stewich,
INVENTORS.

SPATIAL DISCRIMINATION SYSTEM FOR USE WITH PULSED OPTICAL ENERGY AND TELEVISION PICK-UP TUBES

BACKGROUND OF THE INVENTION

In detecting the optical energy of a selected laser signal, normal background interference such as glare, fires, specular and other highlight conditions that can saturate the display tube or monitor must be suppressed. Similarly, discrimination must be provided against deliberate false targets such as flares, search lights, and other optical continuous wave decoys. In deliberate attempts to jam optical trackers, a tracking area is saturated with suspected beacon frequencies in an attempt to cover the estimated span of frequencies that may be utilized. Many of these unwanted signals can be filtered out of received energy with spatial discrimination techniques.

Spatial discrimination is a video processing system operating on video frequency output waveforms of an image storage tube. The image storage tube changes spatial light patterns, the photocathode image, into spatial charge patterns, and then converts these charge patterns into an electrical signal which varies as a function of time. Pulse widths in the electrical signal are directly related to the spatial widths of the charge pattern. Time-domain filtering discriminates against the electrical pulse widths greater than a selected width, responding only to pulses of particular duration or period, and thereby effectively discriminates against the charge patterns that cause the pulses and the corresponding spatial light patterns. As a result, all light patterns in the field of view that subtend an angle greater than a selected value are rejected. Thus, normal background clutter of light patterns is rejected except for point sources. Signals from point sources such as the laser indicator mark and directional steady-state, continuous wave, sources remain intact. An observer scanning an image or a detector circuit must still differentiate between these point source signals to determine which one is the proposed target.

SUMMARY OF THE INVENTION

A spatial discrimination system for use with pulsed optical energy and image storage tubes allows a television viewer or aircraft terminal guidance system to distinguish between steady and pulsed sources of light. Spatial characteristics of a steady point source are destroyed by image displacement modulation during the television integration interval and then a point source discriminator selects the known pulse signal while rejecting the steady displaced signal. Image displacement occurs when the image section of the storage tube is subjected to a varying magnetic field.

In the system a forward observer, in relatively close proximity to a target, designates the target to an airborne weapons carrier at a more distant range by pointing a laser at the target. The laser is fired from the aircraft via a radio link therebetween. Laser energy reflected from the target is detected by a television pick-up tube in the aircraft, for manual observance or automatic guidance of the aircraft toward the target. For a pilot controlled aircraft, all video information except the pulsed laser dot is removed during initial acquisition, thereby enhancing pilot ability to detect the spot on a television monitor. Similarly, in a system without a human observer, such as a missile terminal guidance system that homes on laser energy, removal of all video information other than the pulsed laser spot allows directional steering commands to be generated.

An object of the present invention is to enhance pulsed laser signal detection.

Another object of the present invention is to eliminate confusion from specular highlights and continuous wave hostile decoys and suppress background highlight conditions that can saturate a display tube.

A further object of the present invention is to provide an unambiguous video signal from which target tracking coordinates can be derived.

DESCRIPTION OF THE PREFERRED EMBODIMENT

Figure 1:
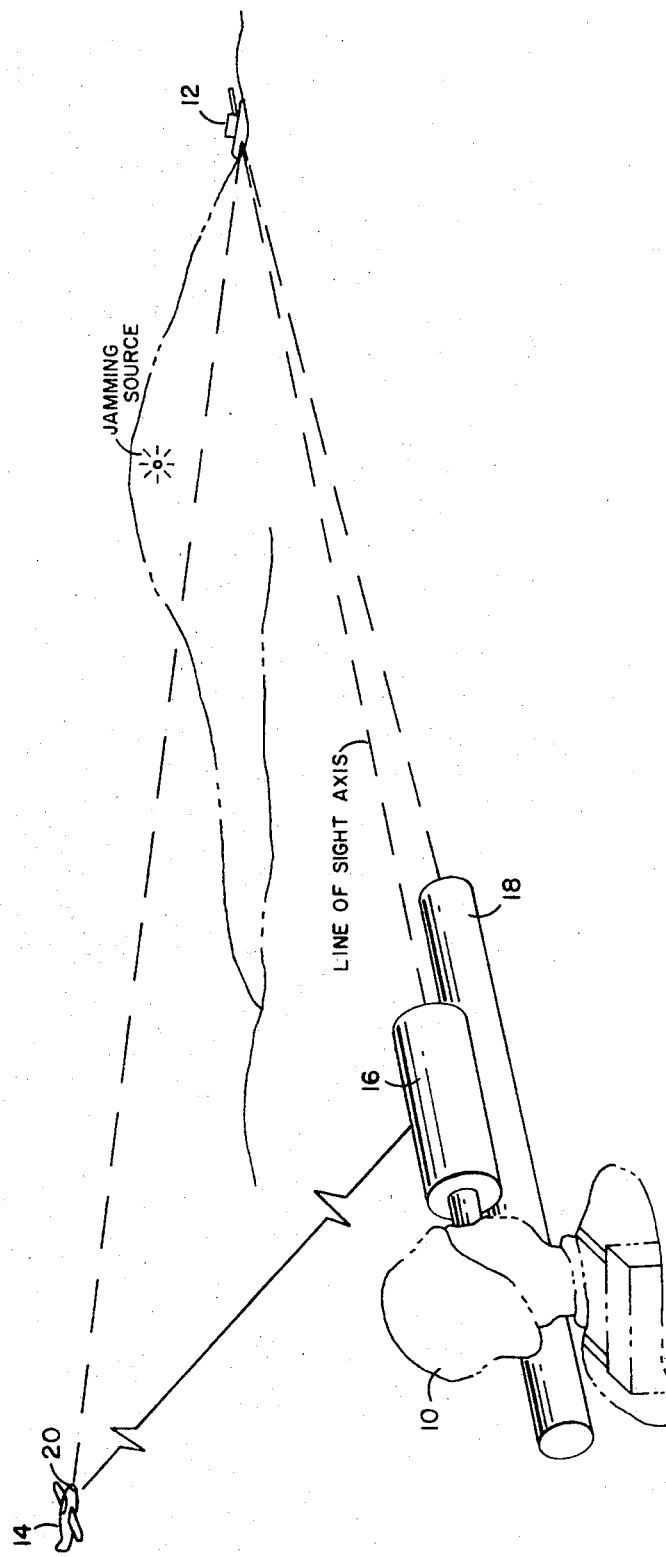
FIG. 1 is a perspective view of an airborne weapons carrier employing an electronic spatial discrimination system.

Referring now to the drawings wherein like numerals refer to like parts in each figure, FIG. 1 is a perspective view disclosing a preferred embodiment of the system. A forward observer 10, relatively close to a target 12, designates the target to an airborne weapons carrier 14. Observer 10 establishes and maintains line-of-sight contact with target 12 through a viewer 16 and points a laser 18 at the target. The laser is fired from aircraft 14 by a radio command link therebetween. Laser energy is reflected from target 12 and is detected by a highly sensitive television camera 20 in the aircraft for directing the aircraft toward the target. Changing the line-of-sight direction of viewer 16, as in tracking a moving target, results in a change in the direction that laser 18 is aimed to maintain direction of bursts of laser energy toward the target. The reflected laser energy is then received by camera 20 from a potentially varying target position, and the aircraft compensates accordingly to maintain direction of flight toward the target.

Figure 2:
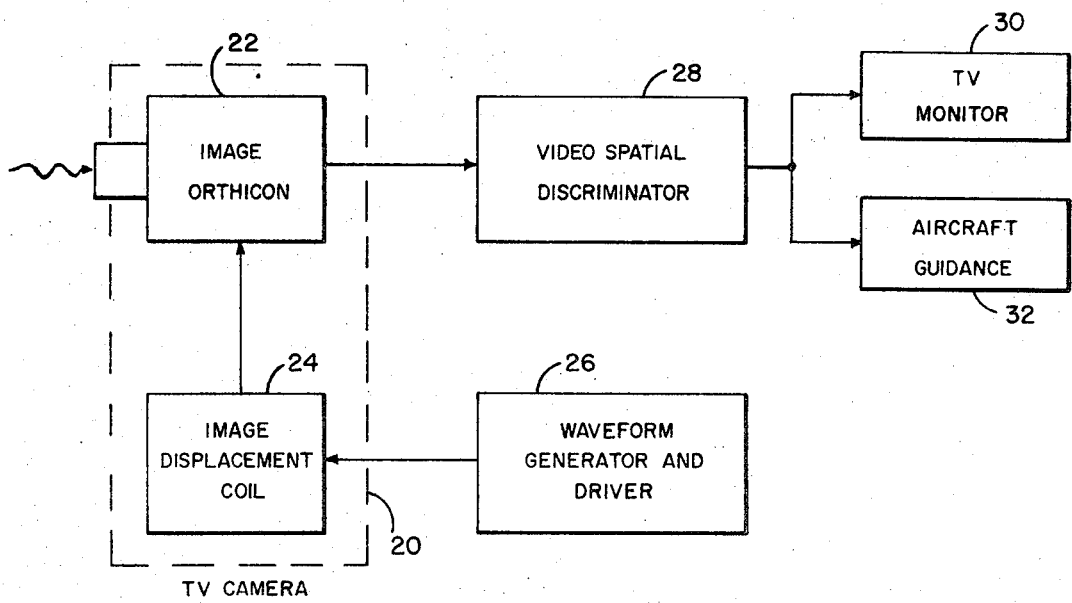
FIG. 2 is a block diagram of the basic configuration for a spatial discrimination system.

As shown in FIG. 2, television camera 20 comprises an image orthicon 22 which receives the optical energy from the direction of target 12. An image displacement coil 24 provides image displacement modulation for image orthicon 22 and is driven by a waveform generator 26. Optical energy received by the orthicon is converted to electrical energy and coupled to a video spatial discriminator 28. Spatial discriminator 28 filters extended charge patterns, allowing only undispersed charges to be passed therethrough. The output electrical energy of discriminator 28 is coupled to a television viewer screen 30 and an aircraft guidance system 32. The output may be connected only to viewer 30 or guidance system 32.

For a pilot controlled aircraft, television monitor 30 provides a display of the area surrounding the target, with the actual target superimposed by a pulsed dot representative of the received laser energy. Image displacement coil 24 and spatial discriminator 28 allow the pilot to remove all video information except the pulsed laser dot during the initial target acquisition phase, thereby enhancing his ability to detect the spot on monitor 30. For a pilotless aircraft, as a missile, an aircraft guidance system 30 that homes on laser energy allows the missile to adjust trajectory to align with the target, insuring missile intercept therewith. For triggering the laser from a missile, radio signal communication can automatically be established at a predetermined time after launch or can be initiated by a missile launch control center.

Removing all video information other than the pulsed laser spot suppresses background optical radiation and hostile decoys, allowing the tracking coordinates to be derived from the laser signal without false signal interference. Spatial discriminator 28 removes all background except small directional optical decoys. Image displacement modulation or smearing produces a smeared image of continuous wave point sources. Thus, all objects except the periodically pulsed laser signal are elongated by the varying magnetic field and filtered out by discriminator 28.

Figure 3:
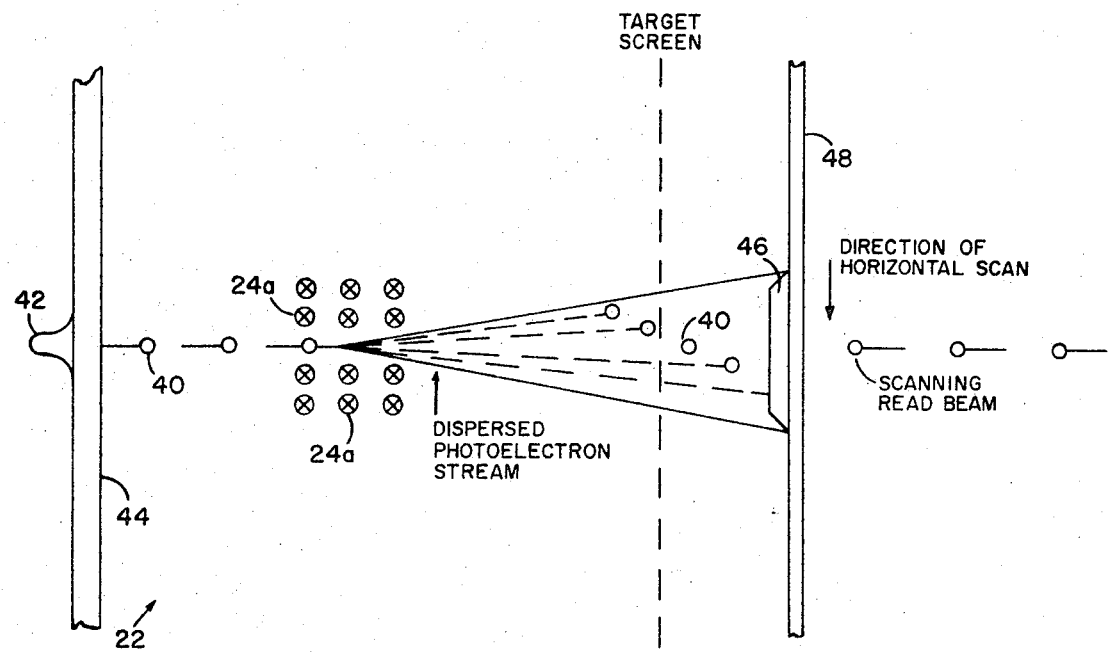
FIG. 3 is a representative view of image displacement modulation in an image orthicon.

Smearing, provided by displacement coil 24, can be implemented in any image tube which has a photoemissive photocathode by deflecting the photoelectrons as they travel to the storage surface. Applicable tubes include the image orthicon and the intensifier vidicon. In the image orthicon, smearing is introduced in the image section; and in the vidicon it is introduced in the intensifier section. The deflection technique is the same for both tubes and is illustrated in FIG. 3. Image orthicon 22 has the image section thereof encompassed by coil 24. The coil is oriented to develop a magnetic field 24a normal to the axis of the image tube and normal to the horizontal raster lines thereof, allowing displacement of an image along the direction of the raster scan lines. For a pure inductive coil 24 driven by a square wave voltage waveform, the resulting current waveform and the magnetic field is triangular. When photoelectrons 40, from a point image 42 on photocathode 44, pass through the triangular magnetic field, they are deflected and produce an elongated charge pattern 46 on the storage surface 48 or mosaic. The triangular current wave insures equal dwell time throughout the deflection width. The deflection frequency of coil 24 must be equal to or greater than the integration time to obtain a complete smear of the charge pattern.

When normal beam readout occurs at the end of the vertical interval, the video signal generated by the scanning electron read beam and the elongated charge pattern does not fulfill the spatial discriminator requirements for acceptance and is eliminated from the video. If the point source input signal has a time duration less than the displacement dwell time on each resolution element, dispersion of charge cannot be obtained and the spatial properties of the point source are preserved even though the entire charge pattern might be displaced slightly. When this charge pattern is read out, it is accepted by the spatial discriminator and appears as a point source in the video display. Thus, the laser signal, because of its short duration, is unaffected by the modulation and still appears as a point image. Small continuous decoys, however, have now become blurred images that can be rejected by the discriminator.

Spatial discrimination with image displacement modulation is applicable in any television system where it is desired to separate a pulsed point source of light from the remaining scene subjects. Typical classes of such systems include video tracking of flashing beacons in a star background, air traffic control, generation of tracking gates for sighting reticles and for computer inputs in fire-control systems.

Although a particular embodiment and form of this invention has been illustrated, it is understood that modification may be made by those skilled in the art without departing from the scope and spirit of the foregoing disclosure. Accordingly, it is understood that the scope of the invention is limited only by the claims appended hereto.

We claim:

1. A target illumination system including spatial discrimination apparatus for tracking said target by providing image displacement modulation of point source and continuous wave energy levels comprising: a housing including an optically sensitive receiver having an image storage tube responsive to an optical input for providing an electronic output to a storage surface thereof, video spatial discrimination mean for periodically scanning said storage surface and accepting and reading out only those video output charges that are undispersed, and an image displacement coil adjacent said storage tube and disposed for developing a magnetic field normal to the axis of said image tube and normal to the horizontal raster lines thereof.

2. A target illumination system as set forth in claim 1 wherein said coil surrounds the image section of said tube and further comprising a waveform generator for driving said coil with a square wave voltage for producing a triangular magnetic field across said tube image section and thereby deflecting photoelectrons passing therethrough.

3. A target illumination system as set forth in claim 2 wherein said image storage tube is an image orthicon.

4. A target illumination system as set forth in claim 2 and further comprising a periodically pulsed laser for directing pulses of collimated light toward said target; and wherein said receiver housing is a missile having said image tube therein directed toward said target for receiving reflected energy from said laser whereby a homing beacon is provided for directing said missile flight toward said target.

5. A method for providing guidance between an aircraft and a target for maintaining said aircraft on a trajectory toward said target, comprising the steps of:
   a. maintaining said target in a line-of-sight relationship with a forward observer stationed in relatively close proximity to said target,
   b. directing a pulse of laser energy from said observer station toward said target during aircraft trajectory toward said target,
   c. receiving and detecting reflected laser energy from said target by an optical receiver housed within said aircraft,
   d. converting said received optical energy into photoelectron streams within an image storage tube,
   e. displacing said electron streams along the direction of the raster scan lines of said tube for providing elongated charge patterns on the storage surface of the tube for eliminating continuous wave signals and suppressing background highlights, f. scanning said storage surface and discriminating between the charges of said charge pattern to read out only undispersed charges, g. correcting the relative position of said aircraft in trajectory toward said target by generating steering commands in response to the relative position of an undispersed charge read out from said storage surface, and h. re-directing pulses of laser energy from said observer station toward said target for maintaining the relative position of said aircraft in trajectory toward said target.

6. A method for providing guidance between an aircraft and a target as set forth in claim 5, further comprising the steps of:

a. activating a laser at said observer station from said aircraft by a radio link between said aircraft and said station to direct said pulses of laser energy toward said target, and b. displaying the reflected laser energy on a television monitor within said aircraft for indicating the location of said target.

7. A method for providing guidance between an aircraft and a target as set forth in claim 5, further comprising the steps of:

a. activating a laser at said observer station from said aircraft by a radio link between said aircraft and said station to direct said pulses of laser energy toward said target, b. receiving and converting said reflected laser energy with an image orthicon, c. displacing said photoelectron stream with a magnetic field developed across the image section of the tube, and d. homing said aircraft on said pulsed laser energy by generating steering commands therein for maintaining said aircraft on a trajectory terminating on impact with said target.

* * * * *